(12) United States Patent
Palmateer et al.

(10) Patent No.: US 7,816,710 B2
(45) Date of Patent: Oct. 19, 2010

(54) PACKAGING FOR AN INTERFEROMETRIC MODULATOR WITH A CURVED BACK PLATE

(75) Inventors: Lauren Palmateer, San Francisco, CA (US); Brian J. Gally, Los Gatos, CA (US); William J. Cummings, Millbrae, CA (US); Manish Kothari, Cupertino, CA (US); Clarence Chui, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 209 days.

(21) Appl. No.: 12/019,590

(22) Filed: Jan. 24, 2008

(65) Prior Publication Data

US 2008/0164544 A1     Jul. 10, 2008

Related U.S. Application Data

(63) Continuation of application No. 11/653,088, filed on Jan. 12, 2007, now Pat. No. 7,443,563, which is a continuation of application No. 10/844,819, filed on May 12, 2004, now Pat. No. 7,164,520.

(51) Int. Cl.
*H01L 29/80* (2006.01)
(52) U.S. Cl. .................. 257/257; 257/432; 257/434; 257/440; 257/443; 257/E29.234
(58) Field of Classification Search .............. 438/50, 438/52; 257/257, 432, 434, 440, 443
See application file for complete search history.

(56) References Cited

U.S. PATENT DOCUMENTS

| 4,036,360 A | 7/1977 | Deffeyes |
| 4,074,480 A | 2/1978 | Burton |
| 4,531,126 A | 7/1985 | Sadones |
| 4,844,614 A | 7/1989 | Henderson et al. |
| 4,983,824 A * | 1/1991 | Saaski et al. ........... 250/227.27 |
| 5,244,707 A | 9/1993 | Shores |

(Continued)

FOREIGN PATENT DOCUMENTS

EP      0 969 700      1/2000

(Continued)

OTHER PUBLICATIONS

Extended European Search Report dated Jan. 26, 2009 for App. No. 08168731.1.

(Continued)

*Primary Examiner*—Wai-Sing Louie
(74) *Attorney, Agent, or Firm*—Knobbe Martens Olson & Bear LLP

(57) ABSTRACT

A package is made of a transparent substrate having an interferometric modulator and a back plate. A non-hermetic seal joins the back plate to the substrate to form a package, and a desiccant resides inside the package. A method of packaging an interferometric modulator includes providing a transparent substrate and manufacturing an interferometric modulator array on a backside of the substrate. A back plate includes a curved portion relative to the substrate. The curved portion is substantially throughout the back plate. The back plate is sealed to the backside of the substrate with a back seal in ambient conditions, thereby forming a package.

20 Claims, 4 Drawing Sheets

U.S. PATENT DOCUMENTS

| | | | |
|---|---|---|---|
| 5,304,419 | A | 4/1994 | Shores |
| 5,591,379 | A | 1/1997 | Shores |
| 5,610,438 | A | 3/1997 | Wallace et al. |
| 5,614,785 | A | 3/1997 | Wallace et al. |
| 5,882,761 | A | 3/1999 | Kawami et al. |
| 5,939,785 | A | 8/1999 | Klonis et al. |
| 6,040,937 | A | 3/2000 | Miles |
| 6,261,853 | B1 | 7/2001 | Howell et al. |
| 6,445,062 | B1 | 9/2002 | Honda |
| 6,589,625 | B1 | 7/2003 | Kothari et al. |
| 6,650,455 | B2 | 11/2003 | Miles |
| 6,674,562 | B1 | 1/2004 | Miles et al. |
| 6,680,792 | B2 | 1/2004 | Miles |
| 6,791,660 | B1 | 9/2004 | Hayashi et al. |
| 7,042,643 | B2 | 5/2006 | Miles |
| 7,060,895 | B2 | 6/2006 | Kothari et al. |
| 7,123,216 | B1 | 10/2006 | Miles |
| 7,164,520 | B2 | 1/2007 | Palmateer et al. |
| 2002/0024711 | A1 | 2/2002 | Miles |
| 2002/0054424 | A1 | 5/2002 | Miles |
| 2002/0056900 | A1 | 5/2002 | Liu et al. |
| 2002/0063322 | A1 | 5/2002 | Robbins et al. |
| 2002/0119724 | A1 | 8/2002 | Hammel |
| 2002/0126364 | A1 | 9/2002 | Miles |
| 2002/0149096 | A1 | 10/2002 | Liebeskind |
| 2003/0062186 | A1 | 4/2003 | Boroson et al. |
| 2003/0108306 | A1 | 6/2003 | Whitney et al. |
| 2003/0121418 | A1 | 7/2003 | Loop et al. |
| 2003/0122137 | A1 | 7/2003 | Hashimoto |
| 2003/0138656 | A1 | 7/2003 | Sparks |
| 2003/0160021 | A1 | 8/2003 | Platt et al. |
| 2003/0184412 | A1 | 10/2003 | Gorrell |
| 2004/0051929 | A1 | 3/2004 | Sampsell et al. |
| 2004/0061492 | A1 | 4/2004 | Lopes et al. |
| 2004/0100677 | A1 | 5/2004 | Huibers et al. |
| 2004/0115856 | A1* | 6/2004 | Jung et al. .............. 438/50 |
| 2004/0122175 | A1 | 6/2004 | Hekal |
| 2004/0166603 | A1 | 8/2004 | Carley |
| 2004/0189195 | A1 | 9/2004 | Allemand |
| 2004/0213962 | A1 | 10/2004 | Bourdelais et al. |
| 2004/0259370 | A1 | 12/2004 | Bergman |
| 2005/0074919 | A1 | 4/2005 | Patel et al. |
| 2005/0093134 | A1 | 5/2005 | Tarn |
| 2005/0247477 | A1 | 11/2005 | Kothari et al. |

FOREIGN PATENT DOCUMENTS

| | | |
|---|---|---|
| EP | 1 251 546 | 10/2002 |
| EP | 1 418 154 | 5/2004 |
| JP | 2003-217828 | 7/2003 |
| WO | WO 02/39513 | 5/2002 |
| WO | WO 02/42716 | 5/2002 |
| WO | WO 03/009317 | 1/2003 |

OTHER PUBLICATIONS

Official Action dated Jun. 26, 2009 in European App. No. 05738076. 8.
Examination Report in Singapore Patent App. No. 200607446-0, dated Mar. 26, 2009.
Search Report and Written Opinion in Singapore Patent App. No. 200607446-0, dated Jul. 8, 2008.
Moraja, et al., Advanced Getter Solutions at Wafer Level to Assure High Reliability to the last Generations MEMS, IEEE Reliability Physics Symposium Proceedings, 2003, pp. 458-459.
Keusseyan et al., A new approach for opto-electronic/MEMS packaging, Proceedings 52nd Electronic Components and Technology Conference, ECTC May 2002, pp. 259-262.
Previti et al., Getters: micromolecular scavengers for packaging, Proceedings International Symposium on Advanced Packaging Materials Processes, Properties and Interfaces, 2001, pp. 201-206.
Office Action dated Dec. 22, 2005 in U.S. Appl. No. 10/844,819.
Office Action dated Nov. 26, 2007 in U.S. Appl. No. 11/653,088.
Search Report for European App. No. 05738076.8, dated Feb. 15, 2008.
ISR and WO for PCT/US2005/013464 filed Apr. 20, 2005.
IPRP for PCT/US05/013464 filed Apr. 20, 2005.

* cited by examiner

PACKAGING FOR AN INTERFEROMETRIC MODULATOR WITH A CURVED BACK PLATE

CROSS REFERENCE TO RELATED APPLICATIONS

This application is a continuation of U.S. application Ser. No. 11/653,088 filed on Jan. 12, 2007, which is a continuation of U.S. application Ser. No. 10/844,819 filed on May 12, 2004, now U.S. Pat. No. 7,164,520. U.S. application Ser. Nos. 11/653,088 and 10/844,819 are incorporated by reference hereby in their entirety.

BACKGROUND

Interferometric modulators are spatial light modulators typically used in display applications. These modulators use interference effects to control the intensity and the color of the light seen by a viewer. One example of such a modulator is the iMoD™. The iMoD employs a cavity having at least one movable or deflectable wall. As the wall, typically comprised at least partly of metal, moves towards a front surface of the cavity, interference occurs that affects the color of light viewed at the front surface. The front surface is typically the surface where the image seen by the viewer appears, as the iMoD is a direct-view device.

The front surface is transparent, as it is the portion of the device through which the viewer views the image. Manufacture of an interferometric modulator is somewhat similar to other types of devices manufactured on glass, such as liquid crystal devices (LCD). However, due to the unique nature of the device, packaging of the device has some other considerations.

Interferometric modulators are microelectromechanical systems (MEMS) devices. While they use a glass substrate like LCDs, they also have moving parts and must have room to move while remaining protected. Similarly, while they are MEMS devices, they are manufactured on a substrate that has different processing considerations than most MEMS devices.

There are some degrees of freedom available to interferometric modulators not available to either LCDs or many MEMS devices. Unlike LCDs, interferometric modulators do not have material injected into the package, such as the liquid crystalline material is into LCD display panels. Unlike many MEMS devices, interferometric modulators do not have parts that rub against one another, alleviating concerns about internal particle generation.

SUMMARY

One aspect of the invention provides an electronic device. The device comprises: a substrate comprising a first surface and a second surface, wherein the second surface is generally flat; an array of microelectromechanical devices formed on the first surface of the substrate; and a back-plate placed over the array and having an interior surface and an exterior surface, the interior surface of the back-plate facing the array with a gap therebetween, the exterior surface facing away from the substrate. A portion of at least one of the interior surface or the exterior surface is curved relative to the second surface of the substrate. The portion may be substantially curved relative to the second surface of the substrate.

A further aspect of the invention provides a method of making an electronic device. The method comprises: providing an intermediate device comprising a substrate comprising a first surface and a second surface, wherein the second surface is generally flat, the intermediate device further comprising an array of microelectromechanical devices formed on the first surface of the substrate; and forming a back-plate over the array of the intermediate device, the back-plate having an interior surface and an exterior surface, the interior surface facing the array with a gap therebetween, the exterior surface facing away from the substrate, wherein a portion of at least one of the interior surface or the exterior surface is curved relative to the second surface of the substrate.

In the foregoing devices, the back-plate may have a convex shape. The back-plate may be generally bowed away from the array. The back-plate may be curved substantially throughout. The back-plate may comprise a central portion over the array and a peripheral portion that may be sealed to the substrate, wherein the central portion may be curved relative to the second surface of the substrate, and wherein the peripheral portion may be generally flat. The electronic device may comprise a seal located between the substrate and the interior surface along edges of the interior surface. The electronic device may comprise a desiccant interdisposed between the interior surface of the back-plate and the substrate.

Another aspect of the invention provides an electronic device, which comprises a substrate comprising a first surface and a second surface, wherein the second surface is generally flat; an array of microelectromechanical devices formed on the first surface of the substrate; a back-plate placed over the array and having an interior surface and an exterior surface, the interior surface of the back-plate facing the array with a gap therebetween, the exterior surface facing away from the substrate. A distance between the interior surface of the back-plate and the second surface of the substrate varies across the substrate.

A still further aspect of the invention provides a method of making an electronic device. The method comprises: providing an intermediate device comprising a substrate and an array of microelectromechanical devices formed on the substrate; and forming a back-plate over the array of the intermediate device, the back-plate having an interior surface and an exterior surface, the interior surface facing the array with a gap therebetween, the exterior surface facing away from the substrate, wherein a distance between the interior surface and the substrate varies across the substrate.

In the foregoing methods, forming the back-plate further may comprise: providing the back-plate having the interior surface; placing the back-plate over the array such that the interior surface faces the array; and binding the back-plate with the substrate along a periphery of the back-plate. The interior surface may be substantially curved. The interior surface may be recessed in a generally central area thereof. The back-plate has substantially the same thickness substantially throughout. The back-plate may comprise a curved portion. The back-plate may comprise subjecting a substantially flat panel to warping. The method may further comprise creating a pressure differential, wherein a first pressure inside the electronic device differs from a second pressure outside the electronic device at least temporarily. The first pressure may be greater than the second pressure. The shape of the back plate may be affected by the pressure differential. The back-plate may be generally bowed away from the array due at least partially to the pressure differential. The step of creating the pressure differential may comprise binding the back-plate to the substrate in an environment with a first pressure that differs from a second pressure in which the electronic device is likely to be used. The pressure differential may comprise binding the back-plate to the substrate in an environment with a first pressure and exposing the device to a second pressure that differs from the first pressure.

BRIEF DESCRIPTION OF THE DRAWINGS

The invention may be best understood by reading the disclosure with reference to the drawings, wherein.

DETAILED DESCRIPTION OF EMBODIMENTS

Figure 1A:
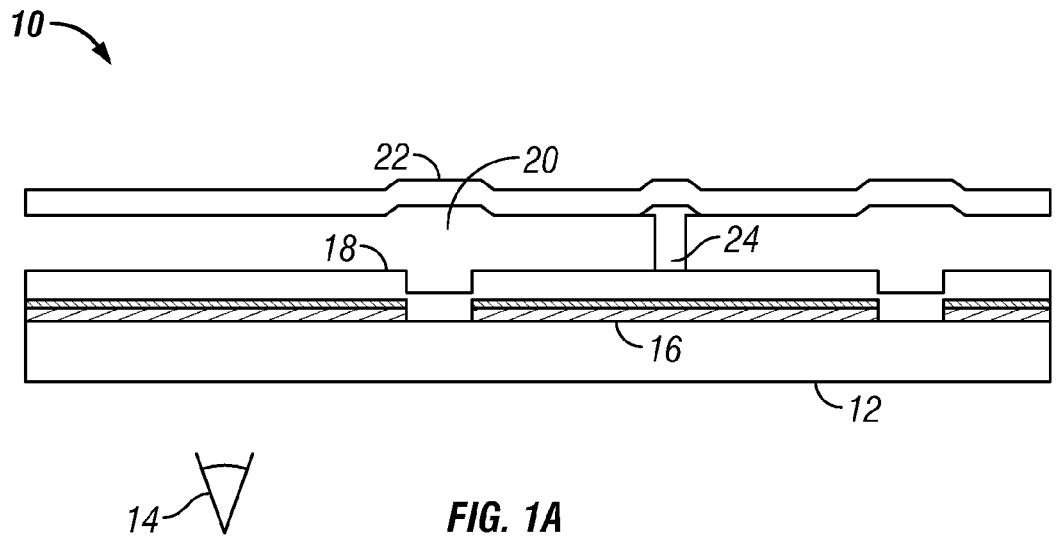
FIGS. 1a and 1b shows an example of an interferometric modulator array.
Figure 1B:
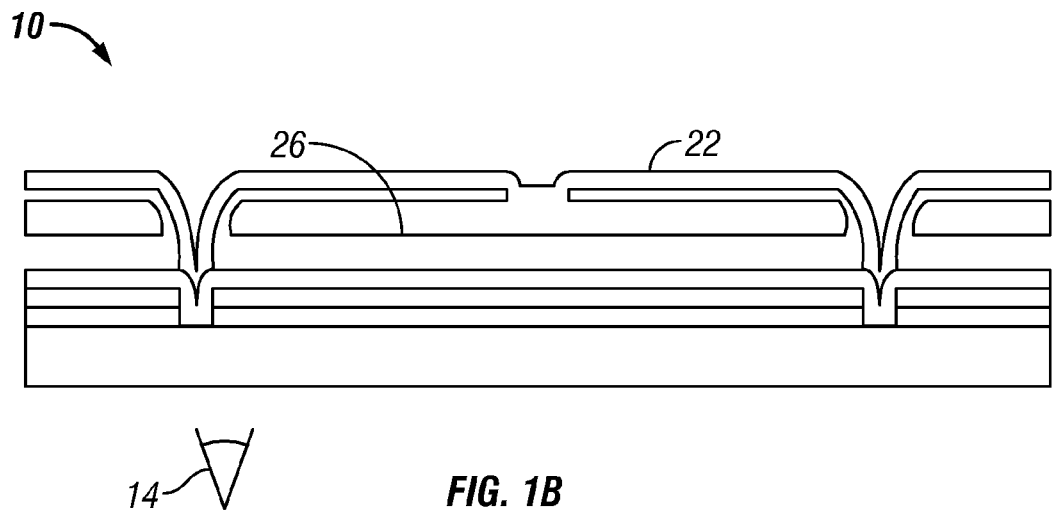

Interferometric modulators, such as the iMoD™, rely upon interference effects operating on light inside the cavity to modulate the light in accordance with image data. Cross-sectional views of such a modulator 10 are shown in FIGS. 1a and 1b. In this embodiment, the viewing surface would be at the 'bottom' of the picture, as shown by the viewer eye 14. The modulator array is formed on a transparent substrate 12. An optical stack 16 forms a first optically active surface that may be affected by the second optically active surface, the mechanical or mirror layer 22. A dielectric layer 18 typically protects the optical stack layer. The mechanical layer 22 is supported by posts such as 24, with the location of posts forming the individual elements of the array.

When the circuitry on the substrate, not shown, is activated in a particular region under the mechanical layer, such as that portion that is suspended over cavity 20, the mechanical layer deflects towards the optical stack 16. As it deflects, the mechanical layer causes the portion of the optical stack as seen by the viewer to appear black. Therefore, by addressing the mechanical layer with image data, an image would be seen by the viewer. This particular embodiment of an interferometric modulator may be referred to as a monolithic interferometric modulator here. This embodiment and those similar to it will be referred to as a membrane interferometric modulator.

In an alternative embodiment of an interferometric modulator shown in FIG. 1b, the mirror 26 that causes the pixel to appear black when deflected is separated from the support layer 22. This may be referred to as a separable modulator here. In either case, the package in which the modulator is encapsulated must account for moisture inside the package that can cloud the transparent substrate 12, as well as any outgassing that may occur from the structure of the modulator layers or package materials. It has some degrees of freedom in that there are no particulates generated by the operation of the device and the devices may be packaged in ambient conditions.

Figure 2:
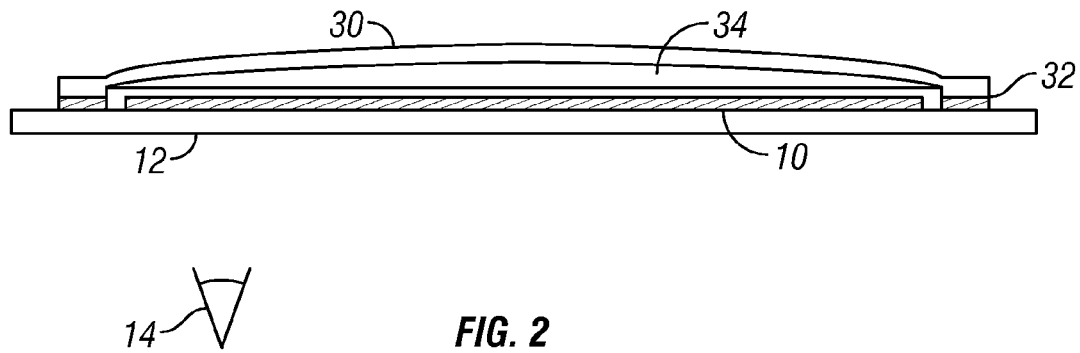
FIG. 2 shows a side view of an embodiment of an interferometric modulator package.

FIG. 2 shows an embodiment of an interferometric modulator in a package. The package is formed between the transparent substrate 12, with the modulator 10 on the 'back side' of the substrate relative to the viewer 14, and a back plate 30. The transparent substrate and the back plate can be joined with a non-hermetic seal 32 joining the back plate to the substrate to form a package. Generally, the package will contain a desiccant such as 34 between the backside of the modulator array and the back plate. This allows for control of the moisture inside the package.

Desiccants are used in other device packages, being a fairly effective means to control moisture inside the package. Desiccants may be used for packages that do or do not have hermetic seals. Hermetic seal, as that term is used here, refers to a seal that is complete, especially with regard to air and water vapor flow. In devices with a hermetic seal, desiccants are typically applied to control moisture resident inside the package. If the package does not have a hermetic seal, a desiccant may be used to control moisture moving into the package.

In the package, the transparent substrate may be any transparent substance that is capable of having thin film, MEMS devices built upon it. Examples include glass, plastic, and transparent polymers. Similarly, the interferometric modulators may be membrane modulators, or modulators of the separable type.

The back plate and the transparent substrate, when brought together may have recessed regions or cavities formed in between them where the modulator arrays reside. The back plate may be glass, metal, foil, polymer, plastic, and ceramic or semiconductor materials such as silicon. The seal between the transparent substrate and the back plate may be an epoxy-based adhesive, o-rings, a PIB, poly-urethane, thin film metal weld, liquid spin-on glass, solder, polymers, and plastics, among others.

Generally, the desiccant is used to control moisture, so any substance that can trap moisture while not interfering with the optical properties of the modulators may be used. Examples include zeolites, molecular sieves, surface adsorbents, bulk adsorbents, and chemical reactants.

In order to provide this type of package to interferometric modulators, cost and complexity become a concern. It is generally desirable to manufacture several arrays of modulators on one transparent substrate, apply the back plate and then split the substrate into individual devices. Some parts of the packaging process may be applied before the division into individual devices as well as after the division.

Figure 3:
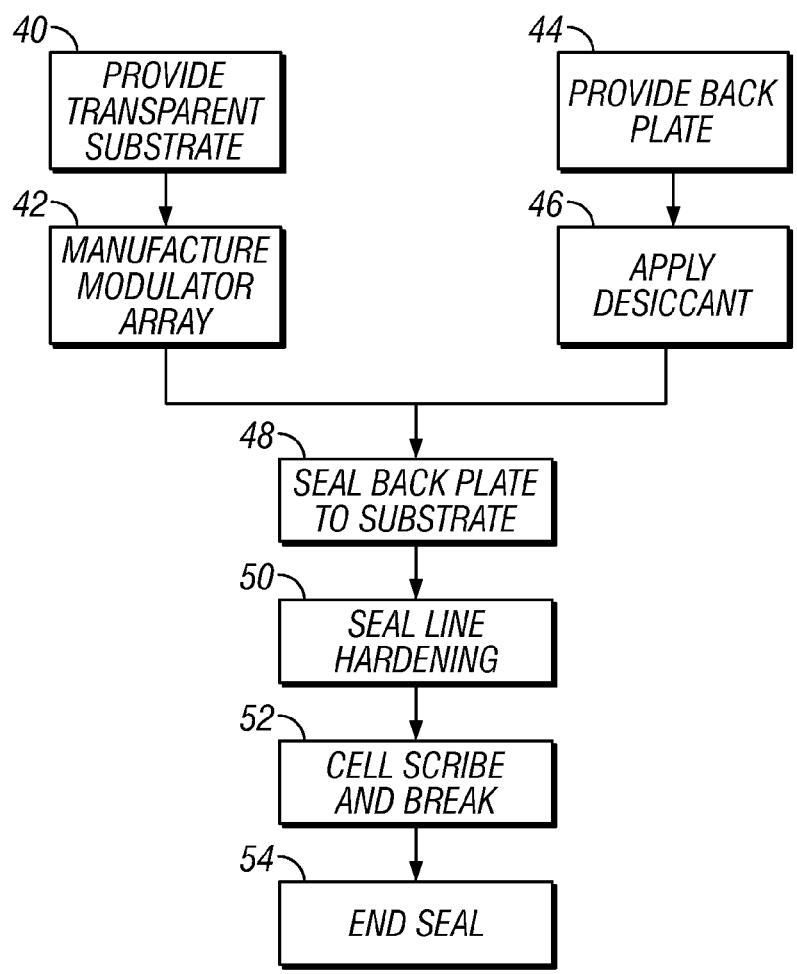
FIG. 3 shows a flow chart of an embodiment of a method to package interferometric modulators.

FIG. 3 shows a method of packaging an interferometric modulator. A transparent substrate is provided at 40 and the modulator array is provided at 42. For faster processing times, as well as more efficient use of the manufacturing lines, it may be desirable to process the back plate at the same time as the transparent substrate. However, this is merely one option and is not required. The back plate is provided at 44 and the desiccant applied at 46. Application of the desiccant may be accomplished after the process of joining the substrate to the back plate, typically by a process of injection, as will be discussed further.

The back plate and the backside, relative to the viewer 14 of FIG. 2, of the transparent substrate are sealed in ambient conditions to form the package. Ambient conditions as used here mean any combination of conditions, such as temperature, pressure or environmental, in which it would not be practical to package other types of devices. More than likely, the variation from what is typically considered ambient conditions of room temperature and room pressure would occur with regard to the pressure.

For example, the packaging process may be accomplished with a starting low pressure subsequently varied to a higher pressure during the sealing process, which may aid in the formation of a good seal between the substrate and the back plate. The pressure may start at vacuum, reach an intermediate pressure and then a higher pressure; may start at a low pressure and go to a higher pressure and any combination in between. Alternatively, the pressure may start at a first pressure and then vary to a low pressure.

Alternatively, the packaging process may be accomplished in a vacuum, pressure between a vacuum up to and including ambient pressure, or pressure higher than ambient pressure and also including a varied and controlled high or low pressure during the sealing process. There may be advantages to packaging the arrays in a completely dry environment, but it is not necessary. Similarly, the packaging environment may be of an inert gas at ambient conditions. The ability to package the devices in ambient conditions allows for a much lower cost procedure and potential for versatility in equipment choice since the device can be transported through ambient conditions without effecting the operation of device.

Many variations on pressures used during packaging could be employed. For example, sealing the back plate could be accomplished in an environment having a initial vacuum, where environmental pressure increases from vacuum to a higher pressure as sealing occurs such that, as pressure in the package increases due to reduced volume, increased environmental pressure aids in creating a good seal.

In another example, the back plate could be sealed in an environment having a initial pressure higher than vacuum up to an including ambient pressure, where environmental pressure then increases to a higher pressure than the initial pressure as sealing occurs such that, as pressure in the package increases due to reduced volume, increased environmental pressure aids in creating a good seal.

In another example, the back plate could be sealed in an environment having an initial environmental pressure higher than ambient pressure, wherein the environmental pressure then increases to a higher pressure than the initial pressure as sealing occurs such that, as pressure in the package increases due to reduced volume, increased environmental pressure aids in creating a good seal.

In the above examples, a partial adhesive curing process in combination with the variation on pressure could affect the shape of the package. For example, the increased pressure inside the package during sealing may create a convex backplane shape by partial adhesive curing during a period of time in which the package is at the higher pressure.

Once the back plate and the substrate are joined, there may be a hardening of the seal. In order to differentiate between the seal between the back plate and the substrate, and seals that may be applied after division into individual arrays, the seal between the back plate and the substrate is referred to here as the back seal. This is the seal that may be hardened, if necessary.

Once the seal is hardened, if necessary, the substrate is scribed or otherwise prepared for division. The wafer may be mechanically scribed or laser scribed. The substrate is then broken into individual devices. This may be an actual breaking process, or may even be a sawing process, among other examples. Depending upon the seal, as well as other factors, it may become necessary after the division to apply an end seal to the packages, to complete the package. The endseal can be referred to as an opening in an otherwise continuous perimeter seal or the use of a continuous perimeter seal in combination with a hole in the back plate. To apply an endseal to the package may involve sealing the hole in the perimeter seal or sealing the hole in the back plate, whichever is acting as the endseal port.

Figure 4:
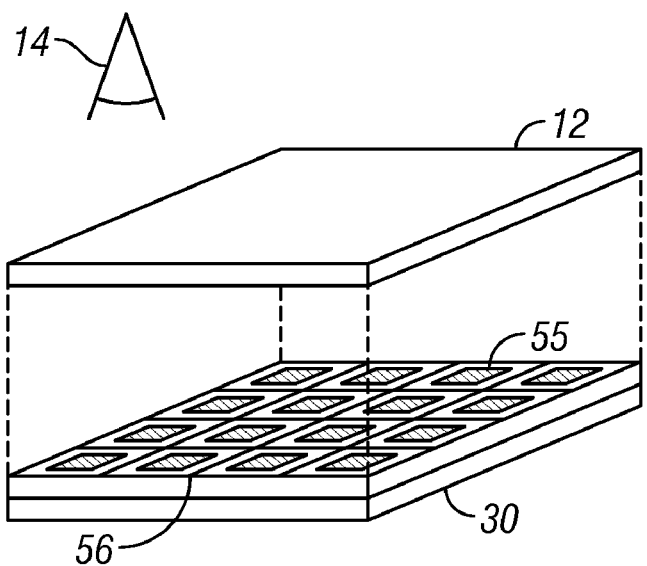
FIG. 4 shows an embodiment of a back plate having recessed regions.

The interferometric modulator will generally be formed on the transparent substrate and the back plate will be recessed to accommodate the modulators and desiccant and allow the modulators to continue to function. For example, providing a back plate in FIG. 3 may involve providing a back plate having recessed regions within which the interferometric modulator manufactured on the transparent substrate will fit. An example of this is shown in FIG. 4. The back plate 30 has regions 56 that are recessed regions in which the modulators will be accommodated. The 'footprints' of the modulators on the backside of the transparent substrate 12 are shown by the shaded regions 55. The back plate 30 is sealed to the transparent substrate and the modulators are encased in the recessed regions 56.

It must be noted that recessed regions are not necessary, but may lead to a longer lifetime of the device. For applications in systems which have reduced lifetimes, or in which a reduce lifetime is desired, the back plate may not have recessed regions. The recessing could be accomplished by application of a thicker seal material, or an external fillet. However, since the seal material does not form a hermetic seal, the thicker seal may allow more water vapor or other contaminants to enter the package, reducing the lifetime of the device.

The recessed regions could be formed in many different ways. One example would be for the recessed regions by forming ribs on the back plate, such as by slurried glass. Another example would be to printing a seal material on the back plate in a pattern to form the ribs. The ribs could be deposited, or stenciled. The recessed regions could be formed in the back plate itself by eroding portions of the back plate, such as by sandblasting or etching. The back plate could be molded or sagged to form the recessed regions. The back plate in the configuration of FIG. 5 can have recesses but it is not necessary as the intermediate frame creates the cavities.

Figure 5:
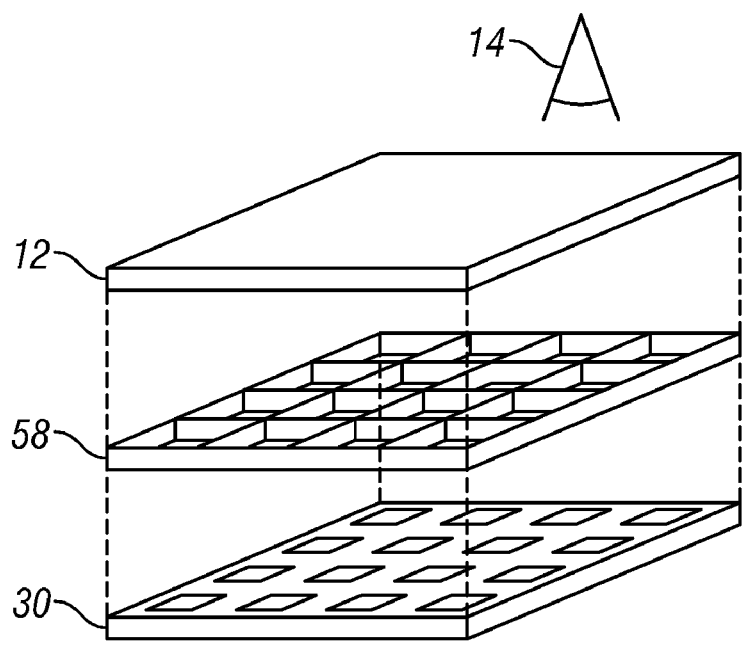
FIG. 5 shows an embodiment of a back plate having recessed regions formed by a frame applied to the substrate.

In an alternative, shown in FIG. 5, an intermediate frame 58 could be mounted on the substrate 12 or the back plate 30, and then the back plate applied. In this instance, the recessed regions are formed between the transparent substrate and the areas of the frame that do not contact the back plate.

In the alternative, the recessed regions could be formed as a function of the transparent substrate, rather than the back plate. For example, the transparent substrate could have integrated spacer posts or the integrated spacers could be on the back plate. The posts would be positioned to be between the multiple modulator arrays on the substrate. Another example would be to provide a back plate of a flexible, polymer sheet that can be flexed to allow the offset between the back plate and the substrate. The above examples are only intended as examples, and are not intended to limit application of the invention in any way.

Figure 6:
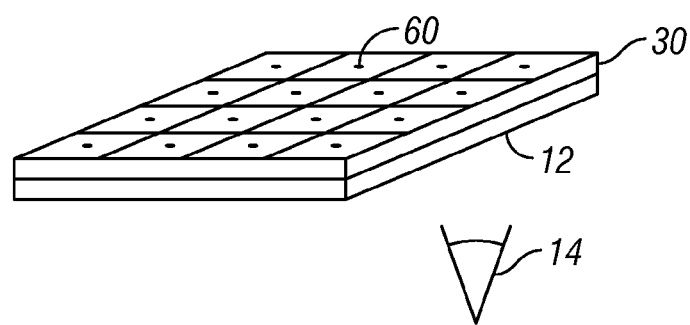
FIG. 6 shows an embodiment of a package having a hole for application of desiccant.

Returning to FIG. 3, the process of applying desiccant may also have several variations. For example, the desiccant could be applied after the substrate and back plate were aligned and joined. A small hole could be left on the back of the back plate, allowing desiccant to be injected into the individual device packages. In this embodiment, sealing the back plate to the substrate also requires the application of a seal to the hole to complete the joining between the back plate and the substrate to form the package. In this case, the desiccant injection hole can also facilitate a continuous perimeter seal process eliminating the typical LCD-type endseal hole used in the perimeter seal. An embodiment of a substrate and back plate having these holes is shown in FIG. 6. The holes 60 in the back plate 30 would be sealed after injection of the desiccant.

The end seal may or may not be necessary. For example, an adhesive may be used in the areas between the modulator regions that allow the substrate to be scribed and broken without causing a break in the seal that requires an end seal process. In an initial non-continuous seal process the adhesive may be a material that can 'flow' such that the hole is filled in by the existing adhesive. In this embodiment, the seal would be self-healing, where self-healing is a mechanism where the adhesive is allowed to flow to close the hole that was initially present as the back plate and substrate were joined The adhesive or other material may move to fill the hole in ambient conditions or with heat application.

In an alternative to avoid the end seal process, the seal lines of joining the back plate to the transparent substrate may be formed to be extra wide. When the substrate is broken, the width of the seal line would prevent the seal from being broken. This may use up too much of the transparent substrate in unusable space, when compared to the cost and complexity of an end seal process. The costs and benefits may differ from process to process and the ultimate selection of which is more beneficial would be left to the process designer.

Figure 7:
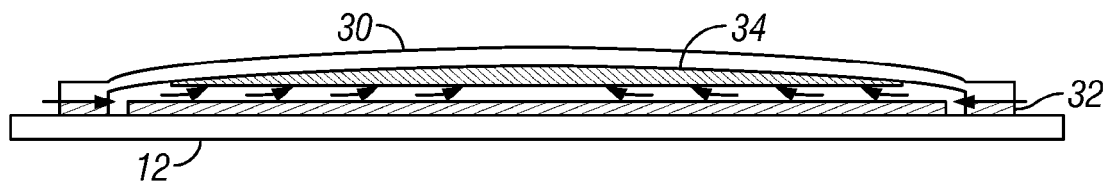
FIG. 7 shows an embodiment of an interferometric modulator packaging having a non-hermetic seal.

In this manner, the packaging of an interferometric MEMS modulator in ambient conditions is provided. As mentioned above, the adhesive or other joining material used to join the substrate to the back plate need not form a hermetic seal. A desiccant may be applied to handle any moisture from water vapor that enters the package. As can be seen in FIG. 7, the desiccant 34 absorbs the moisture that travels though the joint between the adhesive and either the back plate or the substrate as well as through the adhesive itself.

For example, it is desirable to keep the package as thin as possible for viable portable display application while still allowing enough desiccants to support the lifetime expectation of the device. One test predicted a reasonable lifetime of over 10 years at 40 degrees Celsius and 90% relative humidity. The adhesive seal was between 10 and 30 microns of thickness, 2 millimeters in width and a water vapor permeability coefficient of 0.2 to 0.4 gr-mm/m2-kPa-day. These conditions are far more rugged than typical operating environments, but were indicative of the success of the package.

Thus, although there has been described to this point a particular embodiment for a method and apparatus for packaging interferometric modulators, it is not intended that such specific references be considered as limitations upon the scope of this invention except in-so-far as set forth in the following claims.

What is claimed is:

1. An electronic device, comprising:
   a substrate comprising a first surface and a second surface, wherein the second surface is generally flat;
   an array of interferometric modulators formed on the first surface of the substrate;
   a back-plate sealed over the array in an ambient environment and having an interior surface and an exterior surface, the interior surface of the back-plate facing the array with a gap therebetween, the exterior surface facing away from the substrate; and
   wherein a portion of at least one of the interior surface or the exterior surface is curved relative to the second surface of the substrate.

2. The electronic device of claim 1, wherein the portion is substantially curved relative to the second surface of the substrate.

3. The electronic device of claim 1, wherein the back-plate has a convex shape.

4. The electronic device of claim 1, wherein the back-plate is generally bowed away from the array.

5. The electronic device of claim 1, wherein the back-plate is curved substantially throughout.

6. The electronic device of claim 1, wherein the back-plate comprises a central portion over the array and a peripheral portion that is sealed to the substrate, wherein the central portion is curved relative to the second surface of the substrate, and wherein the peripheral portion is generally flat.

7. The electronic device of claim 1, further comprising a seal located between the substrate and the interior surface along edges of the interior surface.

8. The electronic device of claim 1, further comprising a desiccant interdisposed between the interior surface of the back-plate and the substrate.

9. An electronic device, comprising:
   a substrate comprising a first surface and a second surface, wherein the second surface is generally flat;
   an array of interferometric modulators formed on the first surface of the substrate;
   a back-plate sealed over the array in an ambient environment and having an interior surface and an exterior surface, the interior surface of the back-plate facing the array with a gap therebetween, the exterior surface facing away from the substrate; and
   wherein a distance between the interior surface of the back-plate and the second surface of the substrate varies across the substrate.

10. The electronic device of claim 9, wherein the back-plate is bound to the substrate along a periphery of the back-plate.

11. The electronic device of claim 9, wherein the interior surface is substantially curved.

12. The electronic device of claim 9, wherein the interior surface is recessed in a generally central area thereof.

13. The electronic device of claim 9, wherein the back-plate has substantially the same thickness throughout.

14. The electronic device of claim 9, wherein the back-plate comprises a curved portion.

15. The electronic device of claim 9, wherein the back-plate is generally bowed away from the array.

16. The electronic device of claim 9, wherein the back-plate comprises a central portion over the array and a peripheral portion that is sealed to the substrate, wherein the central portion is curved relative to the second surface of the substrate, and wherein the peripheral portion is generally flat.

17. The electronic device of claim 9, further comprising a seal located between the substrate and the interior surface along edges of the interior surface.

18. The electronic device of claim 9, further comprising a desiccant interdisposed between the interior surface of the back-plate and the substrate.

19. The electronic device of claim 9, wherein the back-plate has a convex shape.

20. The electronic device of claim 1, wherein the back-plate has substantially the same thickness throughout.

* * * * *